(12) United States Patent
Guo et al.

(10) Patent No.: US 8,073,425 B2
(45) Date of Patent: Dec. 6, 2011

(54) CHARGING METHOD AND CHARGING SYSTEM

(75) Inventors: Zhongjie Guo, Shenzhen (CN); Xiaorong Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 12/474,735

(22) Filed: May 29, 2009

(65) Prior Publication Data

US 2009/0298466 A1    Dec. 3, 2009

(30) Foreign Application Priority Data

May 30, 2008    (CN) .......................... 2008 1 0113980

(51) Int. Cl.
*H04M 11/00*    (2006.01)
(52) U.S. Cl. .................. 455/408; 455/405; 455/406
(58) Field of Classification Search .... 455/414.1–414.2, 455/406–408; 379/201.01, 201.02, 207.02, 379/207.16, 221.08, 221.09, 221.11, 221.12, 379/373.01–376.01, 87
See application file for complete search history.

(56) References Cited

U.S. PATENT DOCUMENTS

| | | | | |
|---|---|---|---|---|
| 2001/0000505 A1* | 4/2001 | Segal et al. | .................. | 455/405 |
| 2005/0136888 A1* | 6/2005 | Koskinen et al. | ............. | 455/406 |
| 2005/0282519 A1* | 12/2005 | Kobayashi et al. | ........... | 455/408 |
| 2006/0030291 A1* | 2/2006 | Dawson et al. | ................ | 455/405 |
| 2009/0291667 A1* | 11/2009 | Vakil et al. | ..................... | 455/408 |

FOREIGN PATENT DOCUMENTS

CN    1725697 A    1/2006

OTHER PUBLICATIONS

1st Office Action in corresponding Chinese Application No. 200810113980.0 (Jan. 12, 2011).

* cited by examiner

*Primary Examiner* — Kent Chang
*Assistant Examiner* — Keith Fang
(74) *Attorney, Agent, or Firm* — Leydig, Voit & Mayer, Ltd.

(57) ABSTRACT

A charging method, device, and system are disclosed. The charging method includes: receiving a message carrying a charging group ID, and sending a charging request message carrying the charging group ID to a charging node corresponding to the charging group ID for charging according to a corresponding relationship of the charging group ID and the charging node. According to embodiments of the present invention, correct charging for services and merging of fees are realized and meanwhile requirements for real-time charging and separation of public accounts and private accounts are met.

10 Claims, 5 Drawing Sheets

CHARGING METHOD AND CHARGING SYSTEM

CROSS-REFERENCE TO RELATED APPLICATIONS

This application claims priority to Chinese Patent Application No. 200810113980.0, filed May 30, 2008, which is hereby incorporated by reference in its entirety.

FIELD OF THE INVENTION

The present invention relates to a field of mobile communication, and more particularly to a charging method, device, and system.

BACKGROUND

As the telecommunication industry has developed continuously, various new services emerge one after another. Authentication, authorization or accounting mechanism for services becomes increasingly mature and complex. Real-time charging has been more and more widely applied, and charge processing capability also has more important influences on service delivery. Currently, a charging process includes generation and report of a charging event, and rating processing. As for a real-time charging, operations such as balance reservation, abatement and reimbursement are further included. The charging event collects detailed information of services used by a user, including user identification (ID), a service type, a starting time to use, consumption, and quality of service. Once receiving a charging event, a charging system performs a charging processing according to information included in the charging event, together with the data subscribed by the user and the tariff configuration. In the case of the real-time charging, operations of balance reservation, abatement and reimbursement are also performed in cooperation with account management.

Figure 1:
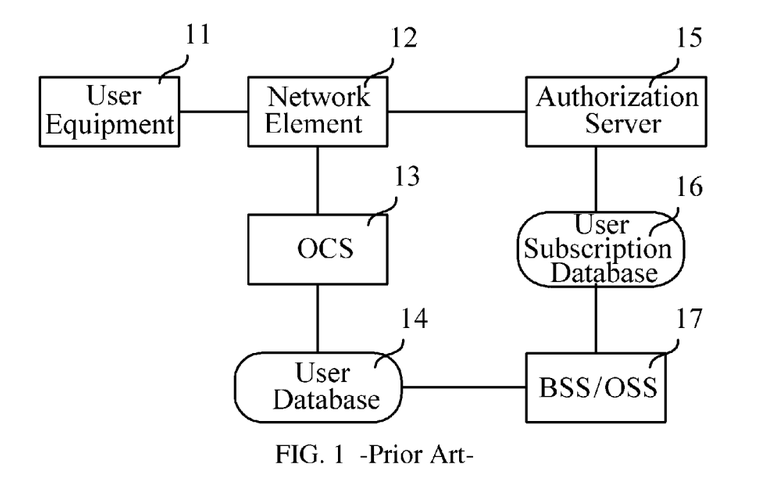
FIG. 1 is a schematic view of a real-time charging system in the conventional art.

FIG. 1 is a schematic view of a real-time charging system in the conventional art. As shown in FIG. 1, services are used at user equipment 11 by accessing a network element 12. The network element 12 generates a charging event and sends the charging event to an online charging system 13 (OCS 13). The OCS 13 processes the charging event, including calculation of charges, credit authorization, balance freeze, consumption abatement and so on. During the charging processing, user data (including product tariffs, account balance, and the like) stored in a user database 14 is used. Once the user equipment 11 accesses the network element 12, the network element 12 requests to perform authentication and service authorization on the user. An authorization server 15 may employ a home subscriber server (HSS), home location register (HLR) or service control point (SCP) and utilize a user subscription database 16 (which may be an HSS/HLR) to identify the user's identity and determine whether the user has subscribed the requested service. A BSS/OSS system 17 is adapted to provide contents about services subscribed by the user and tariffs of the services when processing the user's billing or charging events, thereby implementing interaction of charging information and completing the charging processing.

Although the function of the real-time charging system meets the real-time charging requirements of corporation clients, it cannot meet requirements of the corporation clients about the separation of public accounts and private accounts.

SUMMARY

Accordingly, embodiments of the present invention provide a charging method, a charging device, and a charging system, which are adapted to achieve correct charging for services and merging of fees and meanwhile meet requirements of real-time charging and separation of public accounts and private accounts.

One embodiment of the present invention provides a charging method, which includes: receiving a message carrying a charging grouping ID; and sending a charging request message carrying the charging grouping ID to a charging node corresponding to the charging grouping ID to perform a charging processing according to a corresponding relationship of the charging grouping ID and a charging node.

One embodiment of the present invention further provides a charging device, which includes: a receiving module adapted to receive a message carrying a charging grouping ID; and a sending module adapted to send a charging request message carrying the charging grouping ID to a charging node corresponding to the charging grouping ID to perform a charging processing according to a corresponding relationship of the charging grouping ID and the charging node.

One embodiment of the present invention further provides a charging system, which includes a charging route distribution equipment adapted to receive a message carrying a charging grouping identification (ID) sent by a network element and send a charging request message carrying the charging grouping ID to a charging node corresponding to the charging grouping ID to perform a charging processing according to a corresponding relationship of the charging grouping ID and the charging node.

In the embodiments of the present invention, by introducing the charging group IDs, charging events generated by communication services used by the employees in a corporate client across different administrative domains are routed and managed according to the corresponding relationship between of charging group IDs and the charging nodes, so that charging events with different charging group IDs are routed to different charging nodes, thereby achieving correct charging for services and merging of fees and meanwhile meeting requirements for real-time charging and separation of public accounts and private accounts.

DETAILED DESCRIPTION

The technical solutions of the present invention are described below in further detail through the accompanying drawings and embodiments.

In order to meet the requirements of separation of public accounts and private accounts, the technical solutions of the present invention are applied to the following scenario. Each employee in a corporation has personal communication demands as an ordinary social member. In order to prevent the employees from misusing the phones, many corporations issue various solutions to separation of public accounts and private accounts. In a typical solution, call charges incurred in working hours are paid by the corporation, and those calls made before or after the working hours are paid by the employees themselves. Alternatively, the corporation pays for the employees' communication fees according to a quota, and extra fees exceeding the quota are paid by the employees themselves. Such solutions allow an employee to use the same phone number as a means for both working and private communications. Although these solutions are somewhat embodied with some limitations, they bring more convenience to the employees in daily life, because they are quite convenient for the employees to use a same communication tool, for example, a cell phone. Personally, an employee in a corporation can use his/her private account to pay for the private fees to a mobile communication company. As a family member, the employee may uniformly use a family account to pay for the fees. Meanwhile, the fees paid for private calls may enjoy special tariffs (different from tariff of the corporation that the employee belongs to), and for example, as a family member, the employee may share the free calling minutes or enjoy other preferential services offered to the whole family by a telecommunication company. The private calls made by the employee are generally managed by a local telecommunication company, which is responsible for charging, accounting, and the like.

The embodiments of the present invention provide following technical solutions to a charging method device and system.

Figure 2:
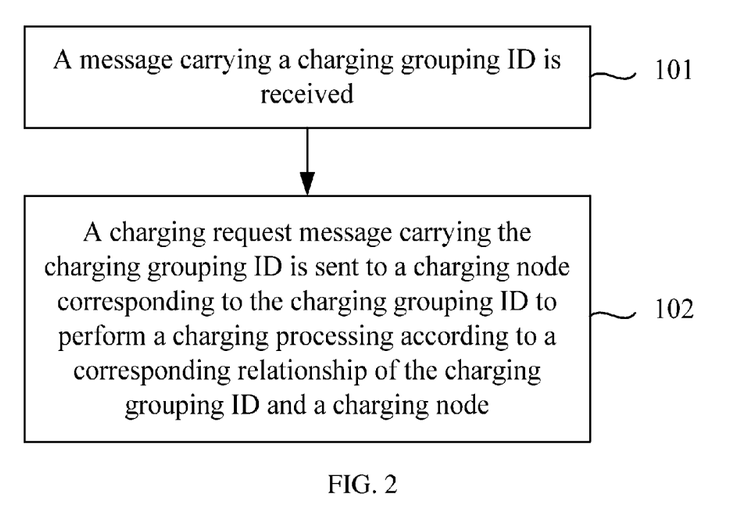
FIG. 2 is a flow chart of a charging method according to one embodiment of the present invention.

FIG. 2 is a flow chart of a charging method according to one embodiment of the present invention. Referring to FIG. 2, the charging method may specifically include following steps:

Step 101: A message carrying a charging grouping ID is received;

Step 102: A charging request message carrying the charging grouping ID is sent to a charging node corresponding to the charging grouping ID to perform a charging processing according to a corresponding relationship of the charging grouping ID and a charging node.

In this embodiment, by introducing the charging grouping IDs, charging events generated by communication services used by the employees in a corporate client across different administrative domains are routed and managed according to the corresponding relationship of the charging grouping IDs and the charging nodes, so that charging events with different charging grouping IDs are routed to different charging nodes, thereby achieving correct charging for services and merging of fees and meanwhile meeting the requirements for real-time charging and separation of public accounts and private accounts.

Figure 3:
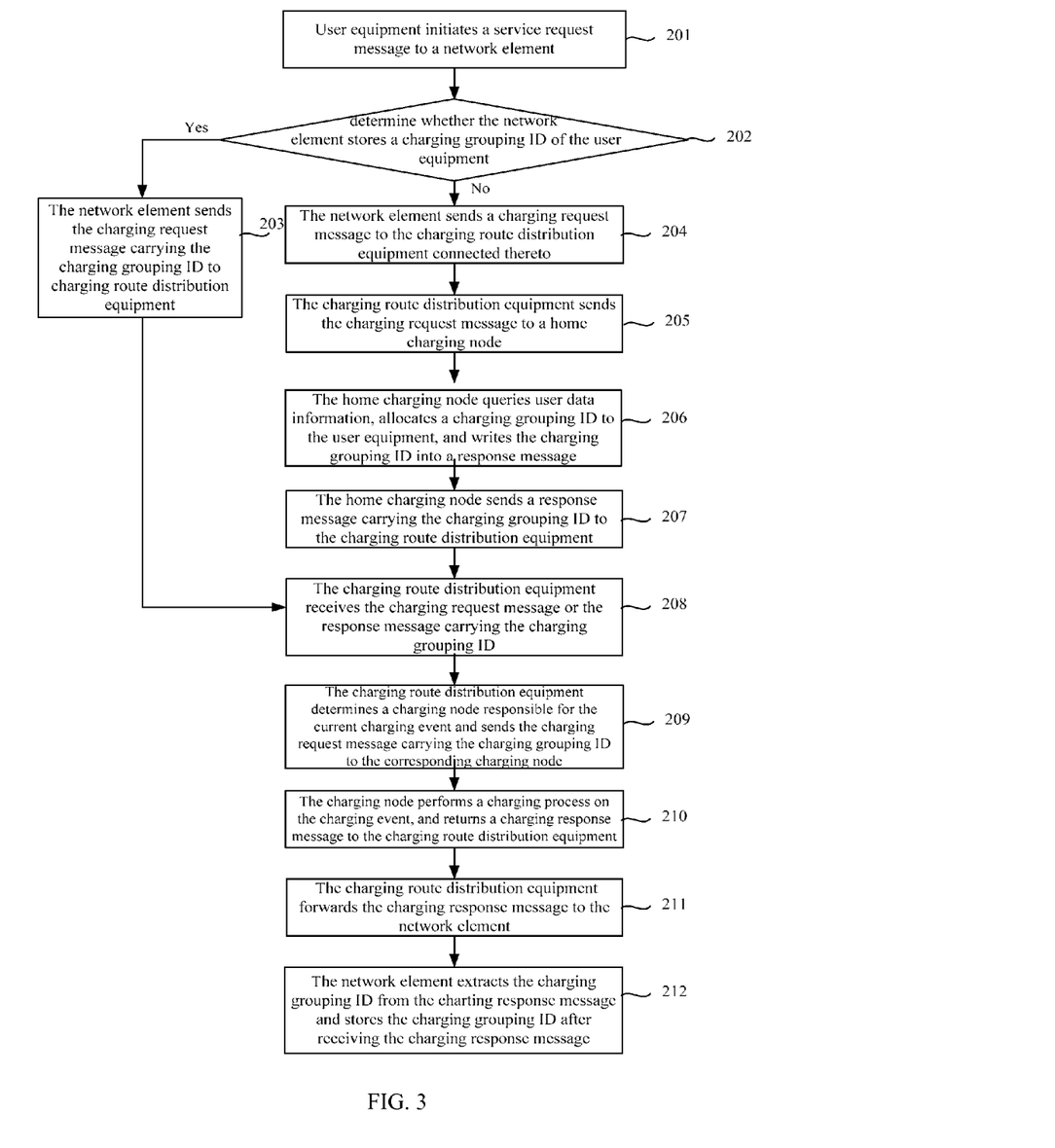
FIG. 3 is a flow chart of a charging method according to another embodiment of the present invention.

FIG. 3 is a flow chart of a charging method according to another embodiment of the present invention. Referring to FIG. 3, in this embodiment, a real-time charging solution is adopted for the charging processing, and a step of routing charging events to different charging nodes to perform a charging processing by charging route distribution equipment according to charging grouping IDs is further added, as compared with the conventional art. A corresponding relationship of charging grouping IDs and charging nodes may be preset in the charging route distribution equipment. Table 1 shows a list of corresponding relationship of the charging grouping IDs and codes of the charging nodes.

TABLE 1

List of Corresponding Relationship of Charging Grouping IDs and Codes of Charging Nodes

| Charging Grouping ID | Code of Charging Node | Remarks |
| --- | --- | --- |
| 1000 | ocs_private | Home Charging Node |
| 8800 | ocs_corp | Corporate Charging Node |

Corresponding charging nodes may be determined according to the codes of charging nodes. A charging node corresponding to ocs_private is a host responsible to perform a charging processing for private calls made by a user in a corporate client, which is generally a home charging node of a private identity of the user. A charging node corresponding to ocs_corp is a host responsible to perform a charging processing for official calls or other calls satisfying certain conditions made by the user in the corporate client. Generally, a large number of users are classified in one charging grouping. Therefore, the list of corresponding relationship is small in scale, which generally does not affect performance of the charging system.

Specifically, this embodiment may include following steps.

Step 201: User equipment initiates a service request message to a network element.

Step 202: The network element determines whether a charging grouping ID of the user equipment is stored according to the service request message, and Step 204 is performed if the charging grouping ID of the user equipment is stored. Step 203 is performed if the charging grouping ID of the user equipment is not stored.

Step 203: The network element writes a charging grouping ID into a charging request message and sends the charging request message carrying the charging grouping ID to charging route distribution equipment, and Step 208 is performed.

Step 204: The network element sends a charging request message to the charging route distribution equipment connected thereto, and the charging request message includes session initiation information, a user ID, and a service session ID.

Step 205: The charging route distribution equipment sends the charging request message to a home charging node.

Step 206: The home charging node queries user data information, allocates a charging grouping ID to the user equipment, and writes the charging grouping ID into a response message according to the charging request message. For example, if the current charging event belongs to corporate calling services, the charging grouping ID allocated to the user equipment is 8800. If the current charging event belongs to private calling services, the charging grouping ID allocated to the user equipment is 1000, or a charging grouping ID allocated to the user equipment is null.

The user data information may be stored in a place accessible for the charging node, for example, in a database or an internal memory connected to the charging node. The user data information includes products user used, tariffs, and charging groupings which various user fees belong to.

Step 207: The home charging node sends a response message carrying the charging grouping ID to the charging route distribution equipment.

Step 208: The charging route distribution equipment receives the message carrying the charging grouping ID, and the message is the charging request message or the response message.

Step 209: The charging route distribution equipment identifies the message received in Step 208, extracts the charging grouping ID, determines a charging node responsible for the current charging event according to a corresponding relationship of the charging grouping ID and the charging node, and sends the charging request message carrying the charging grouping ID to the corresponding charging node. The charging request message includes a user ID, a service session ID, and the charging grouping ID.

For example, if the charging grouping ID extracted is 8800, Table 1 is checked, and it is found that the code of the charging node corresponding to the charging grouping ID is ocs_corp, and therefore the charging node responsible for the current charging event is determined to be a corporate charging node.

This step may further include judging whether the charging grouping ID is non-null and if the charging grouping ID is non-null, a corresponding charging node is determined according to Table 1. If the charging grouping ID is null, the charging node responsible for the current charging event is determined to be a home charging node.

Step 210: The charging node receives the charging request message, performs a charging process on the charging event, and returns a charging response message to the charging route distribution equipment, and the charging response message also carries the charging grouping ID.

Step 211: The charging route distribution equipment forwards the charging response message to the network element.

Step 212: The network element extracts the charging grouping ID from the charging response message and stores the charging grouping ID after receiving the charging response message.

Figure 4:
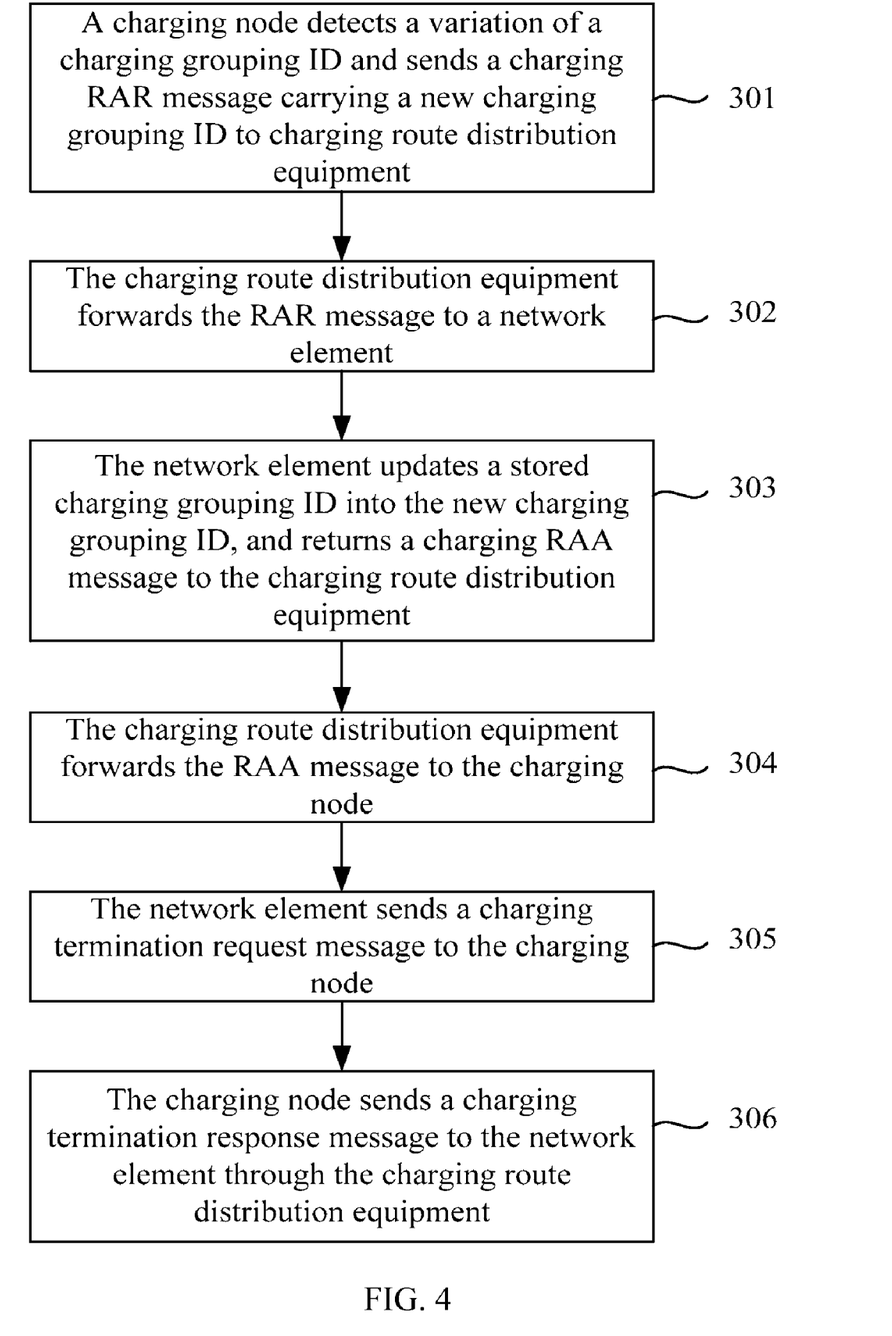
FIG. 4 is a flow chart of a charging re-authorization processing in the charging method according to another embodiment of the present invention.

In practical case, the charging processing for separation of public accounts and private accounts may employ different charging rules, for example, switching based on time, based on account balance, or based on other conditions. In the case of charging according to the switching mode based on time, when a corporate user makes a call, fees charged for call within specified time duration are recorded on the corporate account, and fees charged for call exceeding the specified time duration are paid from a private account. In the case of charging according to the switching based on account balance, the corporation sets a quota of the calling fees for each employee in advance, such that the calling fees not exceeding the upper bound of the quota is paid by the corporation, whereas the exceeding part is paid by the employees. Therefore, the charging grouping to which the user belongs may be varied during a same service process. For example, a charging rule is defined that, calling services made between 8:00 and 18:00 on weekdays are counted as corporate calling services, and the other calling services are counted as private calling services. The calling services made across 8:00 or 18:00 may be respectively classified into different charging groupings before and after the switching points. In this embodiment, such switching may be implemented by using a charging re-authorization processing. FIG. 4 is a flow chart of a charging re-authorization processing in the charging method according to another embodiment of the present invention. Referring to FIG. 4, the processing may include following steps.

Step 301: During a charging process, a charging node detects a variation of a charging grouping ID and sends a charging re-authorization request (RAR) message carrying a new charging grouping ID to charging route distribution equipment.

Step 302: The charging route distribution equipment forwards the RAR message to a network element.

Step 303: The network element extracts the new charging grouping ID from the RAR message, updates a stored charging grouping ID into the new charging grouping ID, and returns a charging re-authorization answer (RAA) message to the charging route distribution equipment.

Step 304: The charging route distribution equipment forwards the RAA message to the charging node.

After Step 304, the processing may further include following steps.

Step 305: The network element sends a charging termination request message to the charging node through the charging route distribution equipment, and the network element needs to send a charging termination request message to the charging node responsible for the charging event before the charging grouping changes if the charging grouping changes.

Step 306: The charging node sends a charging termination response message to the network element through the charging route distribution equipment.

After Step 306, the charging processing is restarted, and the charging event is routed according to a new charging grouping ID.

In this embodiment, a real-time charging solution is adopted for the charging process. Meanwhile, during the process of separation public accounts and private accounts, charging events belonging to corporate calling services are charged by the corporate charging node and charging events belonging to private calling services are charged by the home charging node, thereby achieving correct charging for services and merging of fees and meanwhile meeting the requirements for real-time charging and separation of public accounts and private accounts. Furthermore, the charging account is switched according to the charging re-authorization mechanism if the charging grouping changes, which is applicable to a variety of charging modes for separation of public accounts and private accounts.

Figure 5:
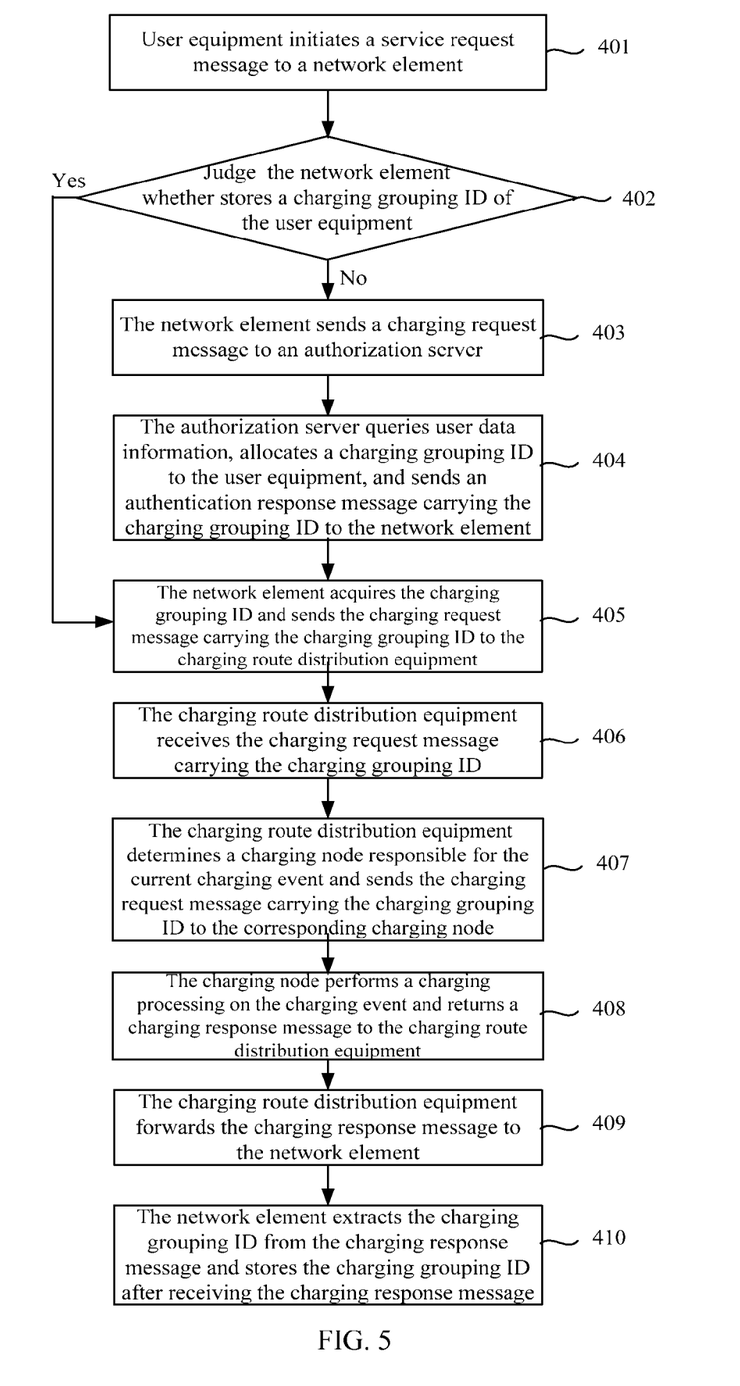
FIG. 5 is a flow chart of a charging method according to another embodiment of the present invention.

FIG. 5 is a flow chart of a charging method according to another embodiment of the present invention. Referring to FIG. 5, the charging method specifically includes following steps.

Step 401: User equipment initiates a service request message to a network element.

Step 402: The network element determines whether a charging grouping ID of the user equipment is stored according to the service request message, and if a charging grouping ID of the user equipment is stored, Step 405 is performed; if a charging grouping ID of the user equipment is not stored, Step 403 is performed.

Step 403: The network element sends a charging request message to an authorization server.

Step 404: The authorization server checks service availability and client availability according to the charging request message and by interacting with a user database, and meanwhile queries user data information, allocates a charging grouping ID to the user equipment, and sends an authentication response message carrying the charging grouping ID to the network element. The user database may be an entity such as a user server, an LS, or an HSS/HLR, for storing service subscription information of users.

Step 405: The network element acquires the charging grouping ID, writes the charging grouping ID into the charging request message, and sends the charging request message carrying the charging grouping ID to the charging route distribution equipment.

Step 406: The charging route distribution equipment receives the message carrying the charging grouping ID, and the message is the charging request message.

Step 407: The charging route distribution equipment identifies the message received in Step 406, extracts the charging grouping ID, determines a charging node responsible for the current charging event according to a corresponding relationship of the charging grouping ID and the charging node, and sends the charging request message carrying the charging grouping ID to the corresponding charging node. The charging request message includes a user ID, a service session ID, and the charging grouping ID.

The step may further include judging whether the charging grouping ID is non-null, and if the charging grouping ID is non-null, a charging node is determined according to Table 1. If the charging grouping ID is null, the charging node responsible for the current charging event is determined to be a home charging node.

Step 408: The charging node receives the charging request message, performs a charging processing on the charging event, and returns a charging response message to the charging route distribution equipment. The charging response message also carries the charging grouping ID.

Step 409: The charging route distribution equipment forwards the charging response message to the network element.

Step 410: The network element extracts the charging grouping ID from the charging response message, and stores the charging grouping ID after receiving the charging response message.

This embodiment may also adopt the charging re-authorization mechanism as described in the second embodiment to switch the charging account during the process of separation of public accounts and private accounts.

In this embodiment, the charging grouping ID is provided by the authorization server. If the charging grouping ID is incorrect, the charging node may check that the current charging event should be processed by another charging node in Step 408, and write a correct charging grouping ID into the charging response message and send the charging response message to the charging route distribution equipment, and then the charging event is routed to the corresponding charging node to process by the charging route distribution equipment.

In this embodiment, the real-time charging solution is adopted for the charging processing. Meanwhile, during the separation of public accounts and private accounts, by introducing the charging grouping IDs, charging events generated by communication services used by the employees in a corporate client across different administrative domains are routed and managed according to the corresponding relationship of the charging grouping IDs and the charging nodes, so that charging events with different charging grouping IDs are routed to different charging nodes, thereby achieving correct charging for services and merging of fees and meanwhile meeting the requirements for real-time charging and separation of corporate accounts and private accounts. Furthermore, the charging account is switched according to a charging re-authorization mechanism if the charging grouping changes, which is applicable to a variety of charging modes for separating corporate accounts from private accounts.

Figure 6:
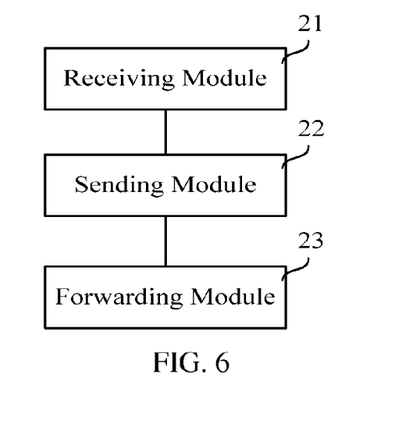
FIG. 6 is a schematic view of a charging device according to an embodiment of the present invention.

FIG. 6 is a schematic view of a charging device according to an embodiment of the present invention. Referring to FIG. 6, the charging device specifically includes a receiving module 21 and a sending module 22. The receiving module 21 is adapted to receive a message carrying a charging grouping ID. The sending module 22 is adapted to send a charging request message carrying the charging grouping ID to a charging node corresponding to the charging grouping ID to perform a charging processing according to a corresponding relationship of the charging grouping ID and the charging node.

This embodiment may also include a forwarding module 23 adapted to forward a charging response message carrying the charging grouping ID returned by the charging node after the charging processing.

In this embodiment, by introducing the charging grouping IDs, charging events generated by communication services used by the employees in a corporate client across different administrative domains are routed and managed according to the corresponding relationship of the charging grouping IDs and the charging nodes, so that charging events with different charging grouping IDs are routed to different charging nodes, thereby achieving correct charging for services and merging of fees and meanwhile meeting the requirements for real-time charging and separation of public accounts and private accounts.

Figure 7:
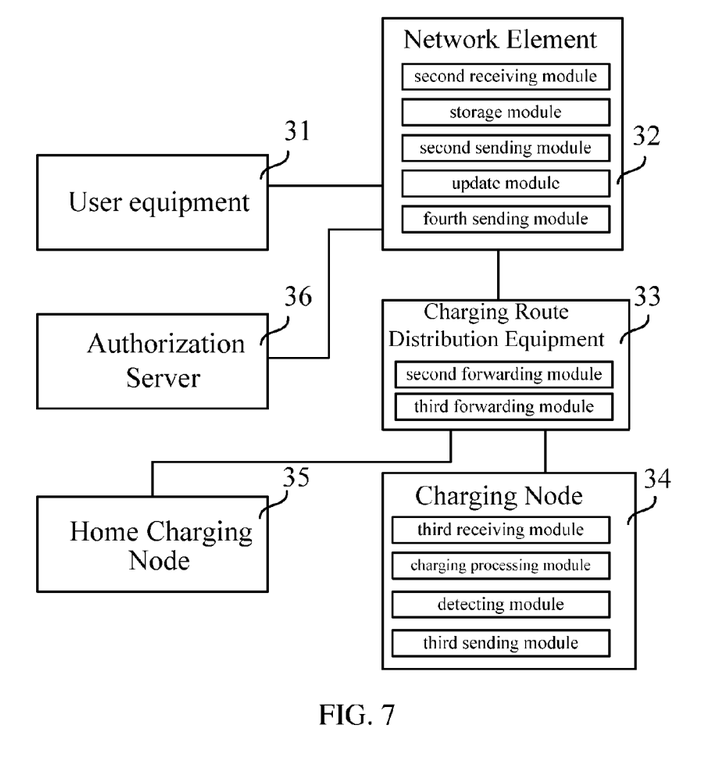
FIG. 7 is a schematic view of a charging system according to an embodiment of the present invention.

FIG. 7 is a schematic view of a charging system according to an embodiment of the present invention. Referring to FIG. 7, the charging system includes a network element 32, charging route distribution equipment 33, and a charging node 34. The network element 32 is adapted to receive a service request message and send a charging request message to the charging route distribution equipment 33. The charging route distribution equipment 33 is adapted to receive the message carrying a charging grouping ID and send the charging request message carrying the charging grouping ID to a charging node corresponding to the charging grouping ID to perform a charging processing according to a corresponding relationship of the charging grouping ID and the charging node. The charging node 34 is adapted to receive the charging request message carrying the charging grouping ID, perform the charging processing, and send a charging response message carrying the charging grouping ID to the charging route distribution equipment 33.

The charging route distribution equipment 33 may include a first receiving module, a first sending module, and a first forwarding module. The first receiving module is adapted to receive a message carrying the charging grouping ID. The first sending module is adapted to send a charging request message carrying the charging grouping ID to the charging node 34 corresponding to the charging grouping ID according to a corresponding relationship of the charging grouping ID and the charging node 34. The first forwarding module is adapted to forward a charging response message carrying the charging grouping ID returned after the charging processing by the charging node 34.

This embodiment may also include user equipment 31 adapted to send a service request message to the network element 32.

The network element 32 mentioned above may also include a second receiving module, a storage module and a second sending module. The second receiving module is adapted to receive the service request message sent by the user equipment 31. The storage module is adapted to store the charging grouping ID. The second sending module is adapted to send the charging request message carrying the charging grouping ID to the first receiving module.

This embodiment may also include a home charging node 35. The charging route distribution equipment 33 may also include a second forwarding module adapted to forward the charging request message sent by the network element 32 to the home charging node 35. The home charging node 35 is adapted to receive the charging request message, query the user data information, allocate a charging grouping ID to the user equipment 31, and send a response message carrying the charging grouping ID to the first receiving module.

This embodiment may also include an authorization server 36 adapted to receive the charging request message sent by the network element 32, query the user data information, allocate a charging grouping ID to the user equipment 31, and send an authentication response message carrying the charging grouping ID to the network element 32.

The charging node 34 may include a third receiving module, a charging processing module, a detecting module, and a third sending module. The third receiving module is adapted to receive the charging request message carrying the charging grouping ID. The charging processing module is adapted to perform the charging processing according to the charging request message. The detecting module is adapted to detect a variation of the charging grouping ID. The third sending module is adapted to send a charging response message carrying the charging grouping ID to the first forwarding module, and send a charging re-authorization request (RAR) message carrying a new charging grouping ID to the charging route distribution equipment 33 when the detecting module detects the variation in the charging grouping ID. The charging route distribution equipment 33 may also include a third forwarding module adapted to forward the charging RAR message carrying the new charging grouping ID to the network element 32 and forward a charging re-authorization answer (RAA) message to the charging node 34. The network element 32 may also include an update module and a fourth sending module. The update module is adapted to update a stored charging grouping ID into the new charging grouping ID according to the new charging grouping ID. The fourth sending module is adapted to send the charging RAA message to the third forwarding module.

In this embodiment, the real-time charging solution is adopted for the charging process. Meanwhile, during the process of separation of public accounts and private accounts, charging events belonging to corporate calling services are charged by the corporate charging node 34 and charging events belonging to private calling services are charged by the home charging node 35, thereby achieving correct charging for services and merging of fees and meanwhile meeting the requirements for real-time charging and separation of corporate accounts and private accounts. Furthermore, if the charging grouping changes, the charging account is switched according to a charging re-authorization mechanism. Therefore, this embodiment is applicable to a variety of charging modes for separating corporate accounts from private accounts.

Those of ordinary skill in the art may understand that, all or a portion of the steps in the above method embodiments may be implemented by instructing relevant hardware via a program. The program may be stored in a computer-readable storage medium. Once the program is executed, the steps of the above method embodiments are accordingly performed. The above storage medium includes any medium capable of storing program codes such as a ROM, a RAM, a magnetic disk, or an optical disk.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A charging method, comprising:
    sending, by a user equipment, a service request message to a network element;
    determining, by the network element, whether a charging grouping identification (ID) of the user equipment is stored according to the service request message, and if the charging grouping ID of the user equipment is stored; sending, by the network element, a charging request message carrying the charging grouping ID to a charging route distribution equipment; if the charging grouping ID of the user equipment is not stored, sending, by the network element, a charging request message without carrying the charging grouping ID to the charging route distribution equipment; sending, by the charging route distribution equipment, the charging request message without carrying the charging grouping ID to a home charging node; and allocating, by the home charging node, a charging grouping ID to the user equipment according to the charging request message and queried user data information, and sending a response message carrying the charging grouping ID to the charging route distribution equipment;
    receiving, by the charging route distribution equipment, the charging request message carrying the charging grouping ID or the response message carrying the charging grouping ID; and
    sending, by the charging route distribution equipment, the charging request message carrying the charging grouping ID to a charging node corresponding to the charging grouping ID to perform a charging processing according to a corresponding relationship of the charging grouping ID and the charging node.

2. The charging method according to claim 1, wherein after performing the charging processing, the method further comprises:
    returning, by the charging node, a charging response message carrying the charging grouping ID to the charging route distribution equipment,
    forwarding, by the charging route distribution equipment, the charging response message to the network element; and
    storing, by the network element, the charging grouping ID after receiving the charging response message.

3. The charging method according to claim 2, wherein after the receiving the charging request message carrying the charging grouping ID or the response message carrying the charging grouping ID by the charging route distribution equipment, the method further comprises:
    judging whether the charging grouping ID is non-null;
    if the charging grouping ID is non-null, sending the charging request message carrying the charging grouping ID to the charging node corresponding to the charging grouping ID according to a corresponding relationship of the charging grouping ID and the charging node; and
    if the charging grouping ID is null, sending the charging request message carrying the charging grouping ID to the home charging node, and performing a charging processing, by the home charging node.

4. The charging method according to claim 1, further comprising:
    detecting, by the charging node, a variation of the charging grouping ID, and sending a charging re-authorization request (RAR) message carrying a new charging grouping ID to the charging route distribution equipment;
    forwarding, by the charging route distribution equipment, the charging RAR message to a network element;
    updating, by the network element, a stored charging grouping ID into the new charging grouping ID according to the new charging grouping ID, and returning a charging re-authorization answer (RAA) message to the charging route distribution equipment; and forwarding, by the charging route distribution equipment, the charging RAA message to the charging node.

5. The charging method according to claim 4, wherein after the forwarding, by the charging route distribution equipment, the charging RAA message to the charging node, the method further comprises:

sending, by the network element, a charging termination request message to the charging node through the charging route distribution equipment; and sending, by the charging node, a charging termination response message to the network element through the charging route distribution equipment.

6. A charging method, comprising:

sending, by a user equipment, a service request message to a network element;

determining, by the network element, whether a charging grouping identification (ID) of the user equipment is stored according to the service request message, and if the charging grouping ID of the user equipment is stored; sending, by the network element, a charging request message carrying the charging grouping ID to a charging route distribution equipment; if the charging grouping ID of the user equipment is not stored, sending, by the network element, a charging request message without carrying the charging grouping ID to an authorization server; allocating, by the authorization server, a charging grouping ID to the user equipment according to the charging request message and queried user data information, and sending an authentication response message carrying the charging grouping ID to the network element; and obtaining, by the network element, the charging grouping ID from the authentication response message, and sending the charging request message carrying the charging grouping ID to the charging route distribution equipment;

receiving, by the charging route distribution equipment, the charging request message carrying the charging grouping ID; and sending, by the charging route distribution equipment, the charging request message carrying the charging grouping ID to a charging node corresponding to the charging grouping ID to perform a charging processing according to a corresponding relationship of the charging grouping ID and the charging node.

7. A charging system, comprising:

a user equipment, configured to send a service request message to a network element;

wherein the network element having:

a second receiving module, configured to receive the service request message sent by the user equipment; and a second sending module, adapted to send a charging request message carrying the charging grouping identification (ID) or a charging request message without carrying the charging grouping ID to a first receiving module;

a charging route distribution equipment, including:

the first receiving module, configured to receive the charging request message carrying the charging grouping ID, or the charging request message without carrying the charging grouping ID from the network element, or a response message carrying the charging grouping ID from a home charging node;

a first sending module, configured to send the charging request message carrying the charging grouping ID to a charging node corresponding to the charging grouping ID to perform a charging processing according to the corresponding relationship of the charging grouping ID and the charging node;

a first forwarding module, configured to forward a charging response message carrying the charging grouping ID and returned after the charging processing by the charging node; and a second forwarding module, configured to forward the charging request message without carrying the charging grouping ID sent by the network element to the home charging node;

wherein the charging node comprises:

a third receiving module, configured to receive the charging request message carrying the charging grouping ID; and a charging processing module, configured to perform charging according to the charging request message; and the home charging node, configured to receive the charging request message without carrying the charging grouping ID from the second forwarding module, query user data information, allocate a charging grouping ID to the user equipment, and send the response message carrying the charging grouping ID to the first receiving module.

8. The charging system according to claim 7, wherein the network element comprises:

a storage module, adapted to store the charging grouping ID.

9. The charging system according to claim 7, the charging node further comprises:

a detecting module, configured to detect a variation of the charging grouping ID; and a third sending module, configured to send the charging response message carrying the charging grouping ID to the first forwarding module; and send a charging re-authorization request (RAR) message carrying a new charging grouping ID to the charging route distribution equipment when the detecting module detects the variation of the charging grouping ID;

wherein the charging route distribution equipment further comprises:

a third forwarding module, configured to forward the charging RAR message carrying the new charging grouping ID to the network element and forward a charging re-authorization answer (RAA) message to the charging node; and wherein the network element further comprises:

an update module, configured to update a stored charging grouping ID into the new charging grouping ID according to the new charging grouping ID; and a fourth sending module, configured to send the charging RAA message to the third forwarding module.

10. A charging system, comprising:

a user equipment, configured to send a service request message to a network element;

wherein the network element comprises:

a second receiving module, configured to receive the service request message sent by the user equipment or an authentication response message carrying the charging grouping ID; and a second sending module, configured to send a charging request message carrying the charging grouping identification (ID) to a first receiving module or a charging request message without carrying the charging grouping ID to an authorization server:

a charging route distribution equipment, including:
  the first receiving module, configured to receive the charging request message carrying the charging grouping ID from the second sending module;
  a first sending module, configured to send the charging request message carrying the charging grouping ID to a charging node corresponding to the charging grouping ID to perform a charging processing according to the corresponding relationship of the charging grouping ID and the charging node; and
  a first forwarding module, configured to forward a charging response message carrying the charging grouping ID and returned after the charging processing by the charging node;

wherein the charging node comprises:
  a third receiving module, configured to receive the charging request message carrying the charging grouping ID; and
  a charging processing module, configured to perform charging according to the charging request message; and the authorization server, configured to receive the charging request message without carrying the charging grouping ID sent by the second sending module, query user data information, allocate a charging grouping ID to the user equipment, and send an authentication response message carrying the charging grouping ID to the network element.

* * * * *